United States Patent
Futsuhara et al.

(10) Patent No.: US 8,672,394 B2
(45) Date of Patent: Mar. 18, 2014

(54) DASH PANEL STRUCTURE FOR AUTOMOBILE

(75) Inventors: Yuki Futsuhara, Shizuoka-ken (JP); Yorisada Kondo, Shizuoka-ken (JP)

(73) Assignee: Suzuki Motor Corporation, Shizuoka-ken (JP)

( * ) Notice: Subject to any disclaimer, the term of this patent is extended or adjusted under 35 U.S.C. 154(b) by 0 days.

(21) Appl. No.: 13/699,840

(22) PCT Filed: Mar. 7, 2011

(86) PCT No.: PCT/JP2011/055232
§ 371 (c)(1),
(2), (4) Date: Nov. 26, 2012

(87) PCT Pub. No.: WO2011/155238
PCT Pub. Date: Dec. 15, 2011

(65) Prior Publication Data
US 2013/0069386 A1    Mar. 21, 2013

(30) Foreign Application Priority Data
Jun. 9, 2010    (JP) ................................. 2010-131997

(51) Int. Cl.
*B62D 25/14*    (2006.01)

(52) U.S. Cl.
USPC ................. 296/187.09; 296/203.02; 296/192; 174/72 A; 180/274

(58) Field of Classification Search
USPC .................. 296/187.09, 192, 203.01, 203.02; 439/34; 174/72 A; 180/90, 274, 232
See application file for complete search history.

(56) References Cited

FOREIGN PATENT DOCUMENTS

| JP | 02182586 A | * | 7/1990 |
|----|------------|---|--------|
| JP | 05008762 A |   | 1/1993 |
| JP | 05-37600 U |   | 5/1993 |
| JP | 3019640 B2 |   | 1/2000 |
| JP | 2004237848 A |  | 8/2004 |

OTHER PUBLICATIONS

International Search Report for Application No. PCT/JP2011/055232 dated Apr. 19, 2011.

* cited by examiner

*Primary Examiner* — Dennis Pedder
*Assistant Examiner* — Beverly Becker
(74) *Attorney, Agent, or Firm* — Lerner, David, Littenberg, Krumholz & Mentlik, LLP

(57) ABSTRACT

A cord-like element 4 is extending along a dash panel 3, a component 19 from the cord-like element 4 is fixed to the dash panel 3 via a bracket 20, the cord-like element 4 is fixed to the bracket 20, the cord-like element 4 and the component 19 are fixed to the dash panel 3 via the bracket 20, the cord-like element 4 is arranged on a vehicle rear side Rr from an opposed surface 20M of the bracket to an engine E, and the rigidity of fixed portions 3K of the dash panel 3 to which fixing portions 28A and 29A of the bracket 20 are fixed is set to be lower than the rigidity of the bracket 20. Accordingly, the fixed portions 3K of the dash panel 3 are deformed before the bracket 20 when the bracket 20 is pressed toward the vehicle rear side Rr by the engine E.

8 Claims, 5 Drawing Sheets

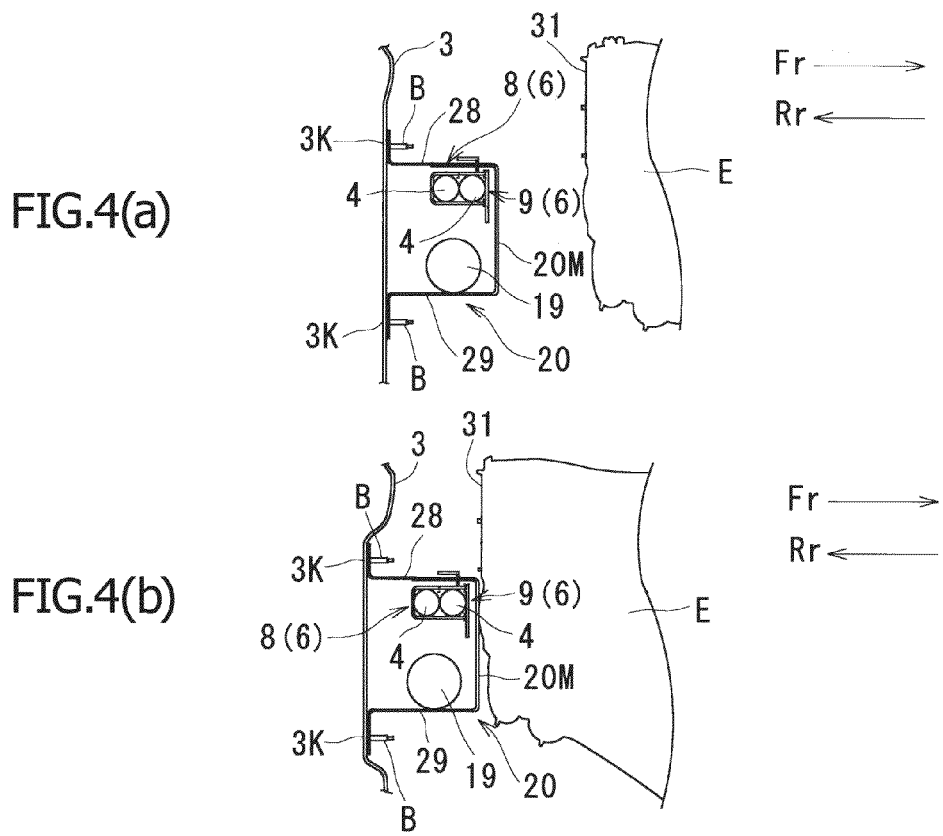
FIG.4(a)
FIG.4(b)
FIG.5
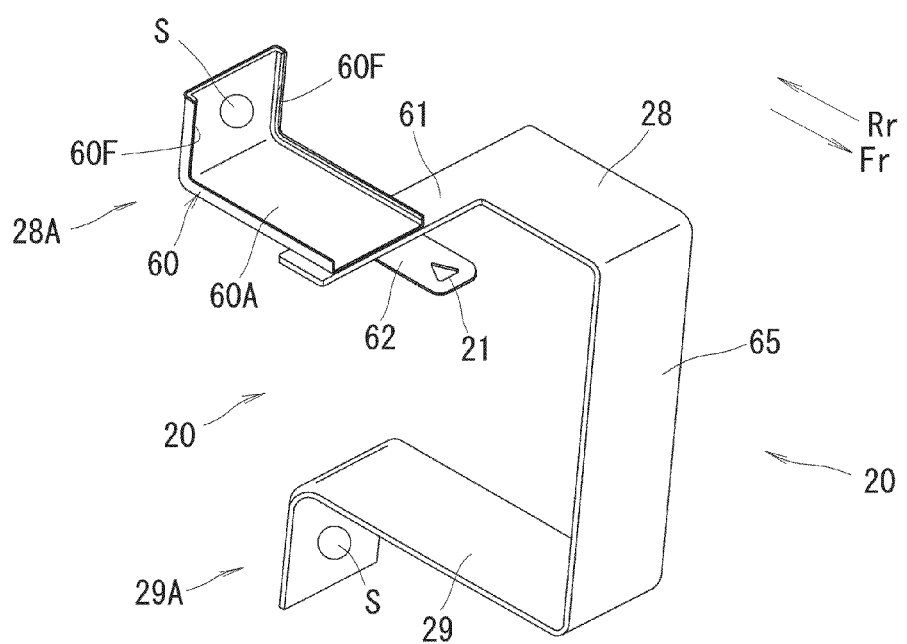

DASH PANEL STRUCTURE FOR AUTOMOBILE

CROSS REFERENCE TO RELATED APPLICATIONS

The present application is a national phase entry under 35 U.S.C. §371 of International Application No. PCT/JP2011/055232, filed Mar. 7, 2011, published in Japanese, which claims priority from Japanese Patent Application No. 2010-131997 filed Jun. 9, 2010, all of which are incorporated herein by reference.

TECHNICAL FIELD

The present invention relates to a dash panel structure for an automobile in which a cord-like element is extending along a dash panel that separates an engine compartment and a vehicle cabin, and a component other than the cord-like element is fixed to the dash panel via a bracket.

BACKGROUND ART

Cited as one example of the cord-like element is a harness connected to a battery of an automobile as disclosed in Patent Literature 1. The harness extends to a vehicle rear side from an engine compartment, is bent in a vehicle width direction close to a front surface of a dash panel to extend in the vehicle width direction along the front surface, is further bent downward, and is bent toward the vehicle rear side to extend to the vehicle rear side.

Conventionally, the harness close to the front surface of the dash panel is supported by a bracket having an L shape in section and covered by a protector having a square-U shape in section.

CITATION LIST

Patent Literature

[PTL 1]
Japanese Patent No. 3019640

SUMMARY OF INVENTION

Technical Problem

In this type of dash panel structure for an automobile, the L-shaped bracket or the protector described above generally has lower rigidity than the dash panel, and thus, together with the bracket or the protector, the harness has sometimes been caught between the dash panel and an engine or the like and thereby damaged upon an automobile collision.

An object of the present invention is to provide a dash panel structure for an automobile which can prevent damage to a cord-like element extending along a dash panel upon a collision and can improve durability.

Solution to Problem

To achieve the object, a dash panel structure for an automobile according to the present invention has a cord-like element is extending along a dash panel that separates an engine compartment and a vehicle cabin, and a component other than the cord-like element is fixed to the dash panel via a bracket, wherein the cord-like element is fixed to the bracket, and the cord-like element and the component are fixed to the dash panel via the bracket, the bracket has an opposed surface located on an engine side with respect to a fixing portion to the dash panel, and the cord-like element is arranged on a vehicle rear side from the opposed surface, and rigidity of a fixed portion of the dash panel to which the fixing portion is fixed is set to be lower than rigidity of the bracket such that the fixed portion of the dash panel is deformed before the bracket when the opposed surface of the bracket is pressed toward the vehicle rear side by the engine.

With the configuration, since the rigidity of the fixed portion of the dash panel to which the fixing portion of the bracket is fixed is set to be lower than the rigidity of the bracket such that the fixed portion of the dash panel is deformed before the bracket when the bracket is pressed toward the vehicle rear side by the engine, the shape of the bracket can be maintained to ensure a space occupied by the cord-like element upon an automobile collision, so that the cord-like element can be prevented from being caught between the engine and the dash panel, and damage to the cord-like element can be prevented.

Also, since the cord-like element is fixed to the dash panel via the bracket for fixing the component other than the cord-like element to the dash panel, it is not necessary to provide a special bracket for fixing the cord-like element to the dash panel, so that the number of parts can be reduced, and the manufacturing cost can be reduced.

In a preferred aspect of the present invention, the bracket includes a plurality of fixing portions as the fixing portion, the plurality of fixing portions are located apart from each other with the cord-like element and the component therebetween in an extension direction of the dash panel, and a plurality of fixed portions as the fixed portion are provided apart from each other corresponding to the plurality of fixing portions in the dash panel.

With the configuration, the fixing strength of the bracket can be increased, bend deformation or the like in the bracket in an automobile collision can be suppressed, and the bracket and the cord-like element can be thereby maintained in a state in which a gap equal to that before the automobile collision is ensured even after the collision. While it is necessary to employ such design dimensions as to obtain a relatively large gap in consideration of unevenness in the position of the cord-like element in order to avoid interference with another part in a case in which the cord-like element is not fixed to the bracket, the design gap between the bracket and the cord-like element can be reduced by fixing the cord-like element to the bracket as in the present invention, so that the bracket can be reduced in size, cost, and weight. Also, the degree of freedom in layout of peripheral parts can be improved.

In another preferred aspect of the present invention, the bracket has two side walls that project toward the engine side from the dash panel side, and is formed in a hat shape in section in which distal ends of the two side walls are connected by the opposed surface, and the cord-like element is fixed to one of the side walls.

With the configuration, the bracket can have a strong structure against a force in a vehicle front-rear direction, and since the cord-like element is fixed to the side wall of the bracket having the strong structure as described above, the space occupied by the cord-like element can be ensured even after the automobile collision, so that the cord-like element can be prevented from being caught between the engine and the dash panel, and damage to the cord-like element resulting therefrom can be prevented.

In still another preferred aspect of the present invention, the fixed portions and a surrounding portion of the dash panel are formed in a single plate-like shape.

In a case in which two or more panels are layered, their surfaces are mostly prevented from exactly overlapping in consideration of improvement in strength and unevenness in fitting with a counterpart, but in this case, there is generated a gap therebetween and electrodes on the both surfaces cannot be simply aligned at a weld position, so that welding needs to be performed while selecting the position of the electrode and automatic welding is thus difficult to perform. However, in the configuration, since the fixed portions of the dash panel are formed in the single plate, automatic welding can be performed by a welding robot when a bolt for attaching the bracket is welded and fixed, so that the personnel cost and the manufacturing cost can be reduced.

Advantageous Effects of Invention

The dash panel structure for an automobile according to the present invention can prevent the damage to the cord-like element extending along the dash panel and can improve the durability of the cord-like element.

BRIEF DESCRIPTION OF DRAWINGS

FIG. 4(a) is a view corresponding to the section along A-A of FIG. 2(b) before a collision; and FIG. 4(b) is a view corresponding to the section along A-A of FIG. 2(b) after the collision.

FIG. 5 is a perspective view of a water pump bracket.

DESCRIPTION OF EMBODIMENTS

In the following, an embodiment for carrying out the present invention will be described based on the drawings.

Figure 1:
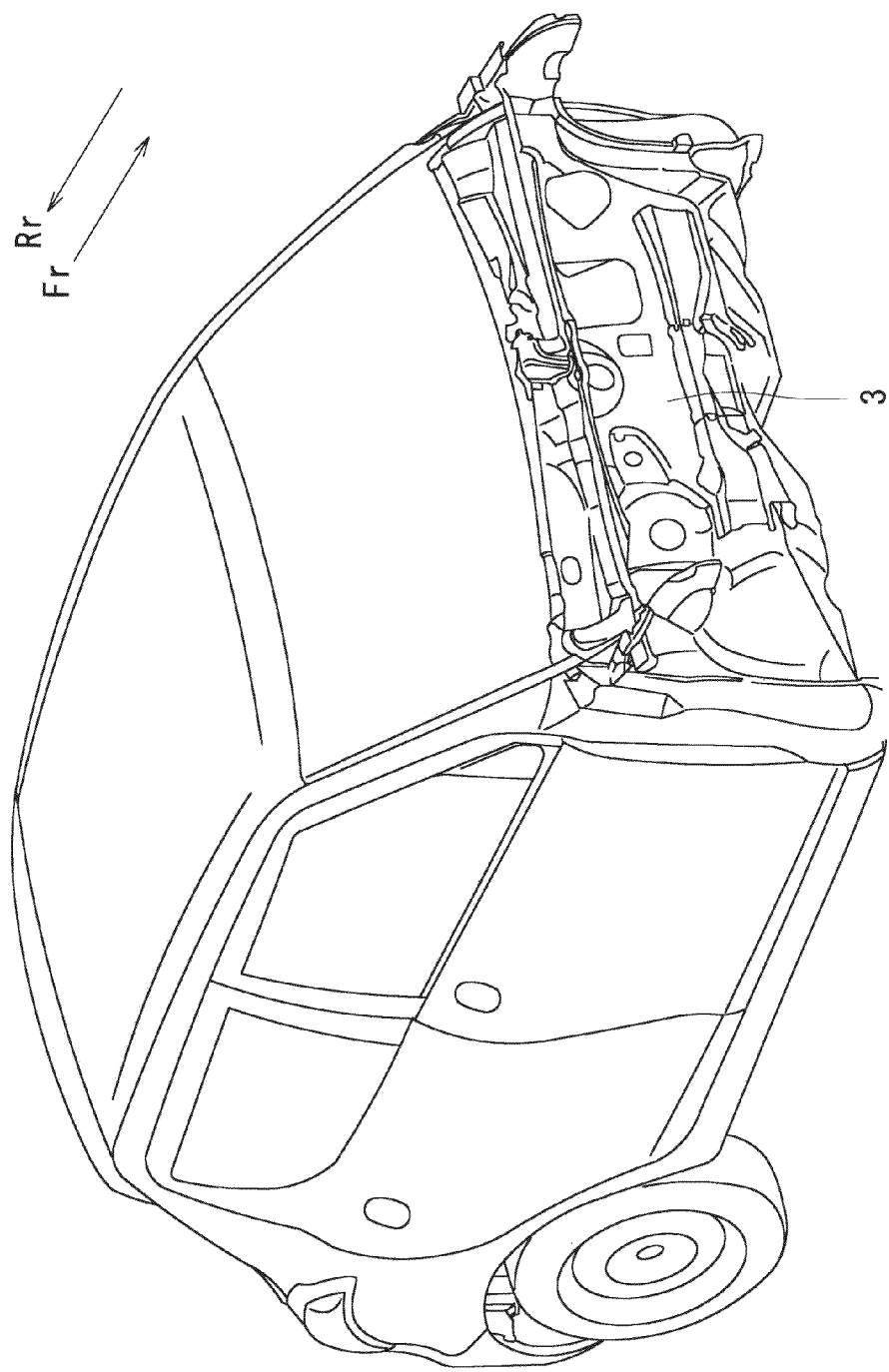
FIG. 1 is a perspective view of an automobile in a state in which a dash panel is exposed by removing an engine compartment.
Figure 2A:
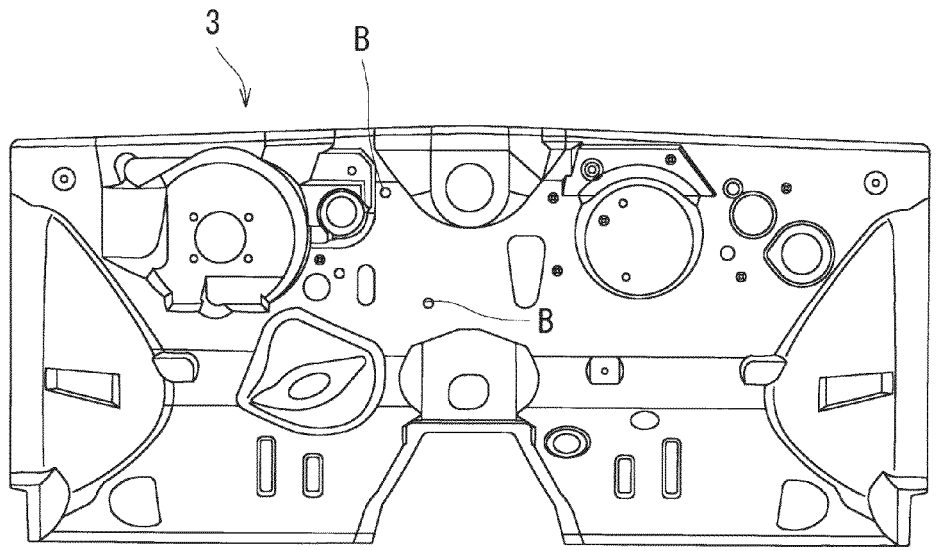
FIG. 2(a) is a front view of the dash panel.
Figure 2B:
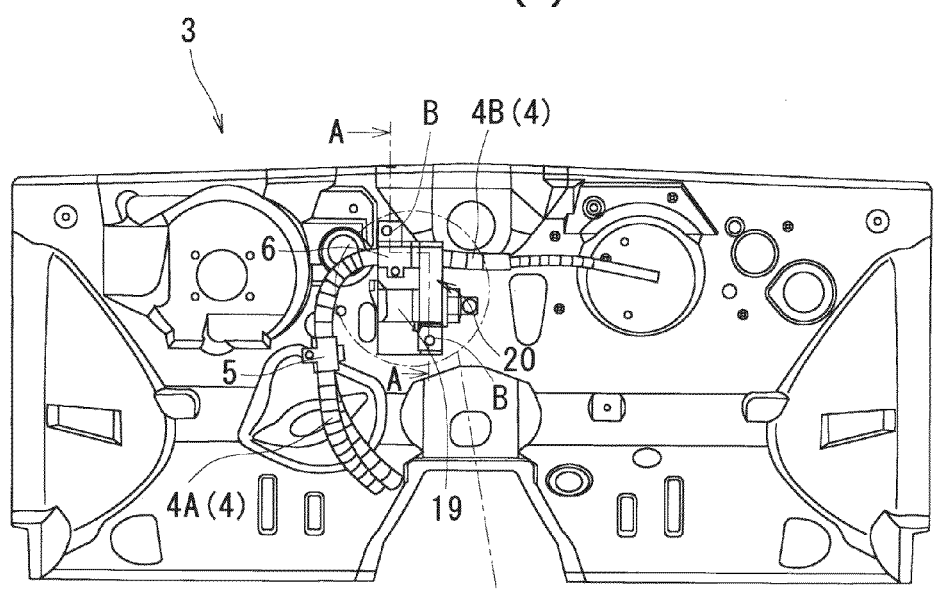
FIG. 2(b) is a view illustrating the arrangement of a bracket for fixing a water pump to a vehicle body, and a wire harness that supplies electricity for driving a running motor.
Figure 2B:
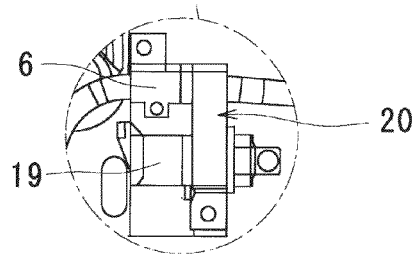
Figure 3:
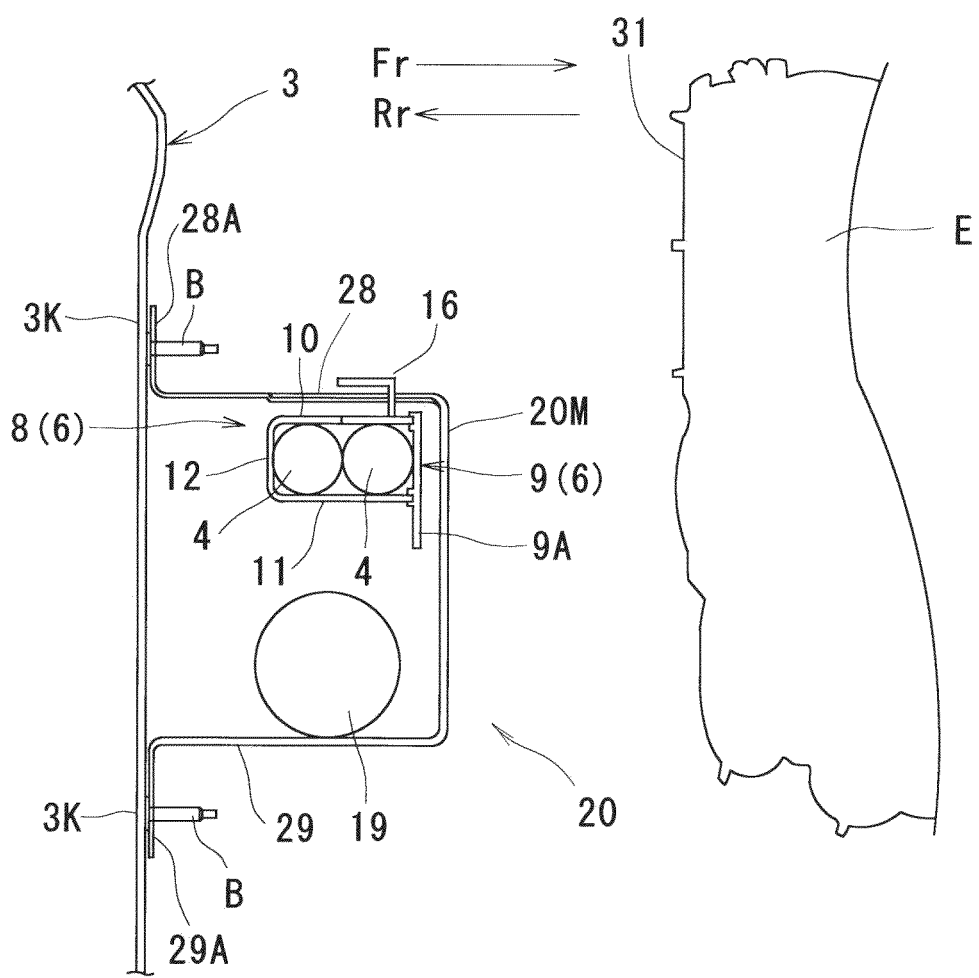
FIG. 3 is a sectional view along A-A of FIG. 2(b).

As shown in FIGS. 1 to 3, two high-voltage wire harnesses 4 (corresponding to a cord-like element) arranged in a vehicle front-rear direction are extending along a dash panel 3 that separates an engine compartment and a vehicle cabin of an automobile. One end portions of the wire harnesses 4 are connected to a battery mounted on a rear portion of the automobile, and the wire harnesses 4 extending from the battery penetrate the dash panel 3 in the vicinity of a floor tunnel from a vehicle rear side Rr and extend upward. The wire harnesses 4 further extend to one end portion side (a left end portion side) in a vehicle width direction, and the other end portions of the wire harnesses 4 are connected to an electric motor for running.

A vertical intermediate portion of a wire harness portion 4A along a vertical direction is covered by a first harness cover 5 made of resin, and a wire harness portion 4B along the vehicle width direction on a side close to the wire harness portion 4A along the vertical direction is covered by a second harness cover 6 made of resin. As shown in FIG. 3, the second harness cover 6 is surrounded by a water pump bracket 20 and fixed to the water pump bracket 20.

As shown in FIG. 3, the second harness cover 6 is composed of a cover body 8 having a square-U shape in vertical section whose vehicle front side Fr is opened, and a lid material 9 that is removable from an opening peripheral edge portion of the cover body 8.

The second harness cover 6 surrounds the two wire harnesses 4. Since the two wire harnesses 4 are arranged in the vehicle front-rear direction, the lengths of an upper-side side wall 10 and a lower-side side wall 11 of the cover body 8 in vertical section are longer than the length of a rear wall 12 of the cover body 8, and are set to be substantially twice the length of the rear wall 12.

As shown in FIG. 4, an extension piece 9A that extends downward from the lower-side side wall 11 of the cover body 8 is formed in the lid material 9.

Also, as shown in FIG. 2(b), the water pump bracket 20 is located below the wire harness portion 4B along the vehicle width direction on the side close to the wire harness portion 4A along the vertical direction, and a water pump 19 (corresponding to a component other than the cord-like element) is fixed to the dash panel 3 via the water pump bracket 20. The water pump 19 pressure-feeds water for a heater in the cabin (water for cooling an engine).

As shown in FIGS. 3 and 5, the water pump bracket 20 is formed in a hat shape in section that projects toward an engine E side from the dash panel 3 side as viewed from the vehicle width direction, and bolt insertion holes S are respectively formed in attachment pieces 28A and 29A (corresponding to a fixing portion) obtained by bending proximal end portions of an upper-side side wall 28 and a lower-side side wall 29. The water pump bracket 20 is set to have a larger plate thickness than the dash panel 3.

As shown in FIG. 5, the attachment piece 28A of the upper-side side wall 28 is provided by coupling an L-shaped member 60 as a separate member from the upper-side side wall 28 to the upper-side side wall 28. More specifically, a first extension portion 61 extends to a width outer side of the upper-side side wall 28 from the proximal end portion of the side wall 28, and one piece 60A of the L-shaped member 60 is welded and coupled to an upper surface of an extension end portion of the first extension portion 61, to thereby form the attachment piece 28A of the upper-side side wall 28.

A second extension portion 62 extends to the vehicle front side Fr from a longitudinal intermediate portion of the first extension portion 61, and a triangular engagement hole 21 is formed in the second extension portion 62. A flange 60F is formed at both width end portions of the L-shaped member 60. Accordingly, the rigidity and strength of the L-shaped member 60 are improved. A bead may be formed instead of the flange 60F. Also, a flange may be formed at both width end portions of the upper-side side wall 28, the lower-side side wall 29, and a top wall 65 that connects the walls.

Accordingly, the rigidity and strength of the upper-side side wall 28, the lower-side side wall 29, and the top wall 65 can be improved. As a result, vibrations of the water pump 19 during driving can be made difficult to transfer to the vehicle cabin through the dash panel 3, and a passenger can be prevented from feeling uncomfortable.

As shown in FIG. 3, a pair of stud bolts B fixed to the dash panel 3 are inserted through the bolt insertion holes S, and nuts are screwed onto the stud bolts B to fix the attachment pieces 28A and 29A to the dash panel 3.

The water pump 19 is inserted through a lower half portion of the water pump bracket 20. The second harness cover 6 that surrounds the two wire harnesses 4 is surrounded by an upper half portion of the water pump bracket 20, and an engagement claw of an engagement portion 16 having an L shape in section that is formed on the upper-side side wall 10 of the cover body 8 of the second harness cover 6 is engaged with the engagement hole 21 (see FIG. 5) in the upper-side side wall 28 of the water pump bracket 20, so that the wire harnesses 4 are fixed to the water pump bracket 20. That is, the wire harnesses 4 are fixed to the upper-side side wall 28 of the water pump bracket 20.

As described above, the wire harnesses 4 are fixed to the water pump bracket 20, and the wire harnesses 4 and the water pump 19 are fixed to the dash panel 3 via the water pump bracket 20. The engine E is arranged on the vehicle front side Fr of the water pump 19, and the wire harnesses 4 are arranged on the vehicle rear side Rr from an opposed surface 20M of the water pump bracket 20 to the engine E. The opposed surface 20M of the water pump bracket 20 is substantially along the vertical direction, and a rear surface 31 of the engine E to which the opposed surface 20M is opposed is also substantially along the vertical direction.

The plurality of attachment pieces 28A and 29A of the water pump bracket 20 are located with the wire harnesses 4 and the water pump 19 therebetween as viewed from the vehicle front-rear direction so as to be located apart from each other, and the upper-side attachment piece 28A is located above the wire harnesses 4 and the lower-side attachment piece 29A is located below the wire harnesses 4.

A plurality (equal to the number of attachment pieces 28A and 29A) of fixed portions 3K of the dash panel 3 to which the attachment pieces 28A and 29A of the water pump bracket 20 are fixed are provided, and the plurality of fixed portions 3K are located apart from each other corresponding to the plurality of attachment pieces 28A and 29A (see FIG. 3). Also, a dash panel portion around the water pump bracket 20 including the fixed portions 3K is formed in a single plate-like shape. Thus, a reinforcement material or the like does not exist in the dash panel portion.

The rigidity of the fixed portions 3K (a dash panel portion around a proximal end portion of the stud bolt B) of the dash panel 3 to which the attachment pieces 28A and 29A of the water pump bracket 20 are fixed is set to be lower than the rigidity of the water pump bracket 20 such that the fixed portions 3K of the dash panel 3 are deformed before the water pump bracket 20 when the water pump bracket 20 is pressed toward the vehicle rear side Rr by the engine E.

With the structure, when the automobile collides with a front obstacle during running, a front side of the wire harnesses 4 is protected by the water pump bracket 20 having high strength while the engine E is pressed by the obstacle to move backward as shown in FIGS. 4(*a*) and 4(*b*).

That is, upon the automobile collision, the shape of the water pump bracket 20 can be maintained to ensure a space occupied by the wire harnesses 4, so that the wire harnesses 4 can be prevented from being caught between the engine E and the dash panel 3, and damage to the wire harnesses 4 can be prevented.

Also, since the wire harnesses 4 are fixed (together with the component from the wire harnesses 4) to the dash panel 3 via the water pump bracket 20 for fixing the water pump 19 as the component to the dash panel 3, it is not necessary to provide a special bracket for fixing the wire harness to the dash panel, so that the number of parts can be reduced, and the manufacturing cost can be reduced.

That is, while the wire harnesses 4 are normally fixed by a special bracket, a welding bolt and a fastening nut, or the like so as to reduce unevenness in vehicle assembling (unevenness in an assembling state of the wire harnesses 4 in each vehicle), the wire harnesses 4 are fixed to the water pump bracket 20 in the structure in the present invention, so that the special bracket or the welding bolt and the fastening nut are not required, the number of parts can be reduced, and the manufacturing cost can be reduced.

A design gap between the water pump bracket 20 and the wire harnesses 4 can be reduced, and the water pump bracket 20 can be thereby reduced in size, cost, and weight. Also, the degree of freedom in layout of peripheral parts is improved. Moreover, since the region of the dash panel 3 to which the stud bolts B are welded is composed of a single sheet metal, the stud bolts B can be automatically welded by a robot, so that the personnel cost and the manufacturing cost can be reduced.

Since the water pump bracket 20 is formed in a hat shape in section that projects toward the engine E side from the dash panel 3 side, the water pump bracket 20 can have a strong structure against a force in the vehicle front-rear direction. Since the wire harnesses 4 are fixed to the upper-side side wall 28 of the water pump bracket 20 having the strong structure as described above, the space occupied by the wire harnesses 4 can be ensured even after the automobile collision, so that the wire harnesses 4 can be prevented from being caught between the engine E and the dash panel 3, and damage to the wire harnesses 4 can be prevented.

The present invention is not limited to the aforementioned embodiment, and various modifications and changes may be made without departing from the scope of the present invention.

For example, the bracket for fixing the wire harnesses 4 may not necessarily be the bracket for fixing the water pump 19, and any bracket arranged in the engine compartment 1, e.g., a bracket for a canister may be employed.

Also, the cord-like element may be a flexible hose such as a fuel hose.

Figure 6:
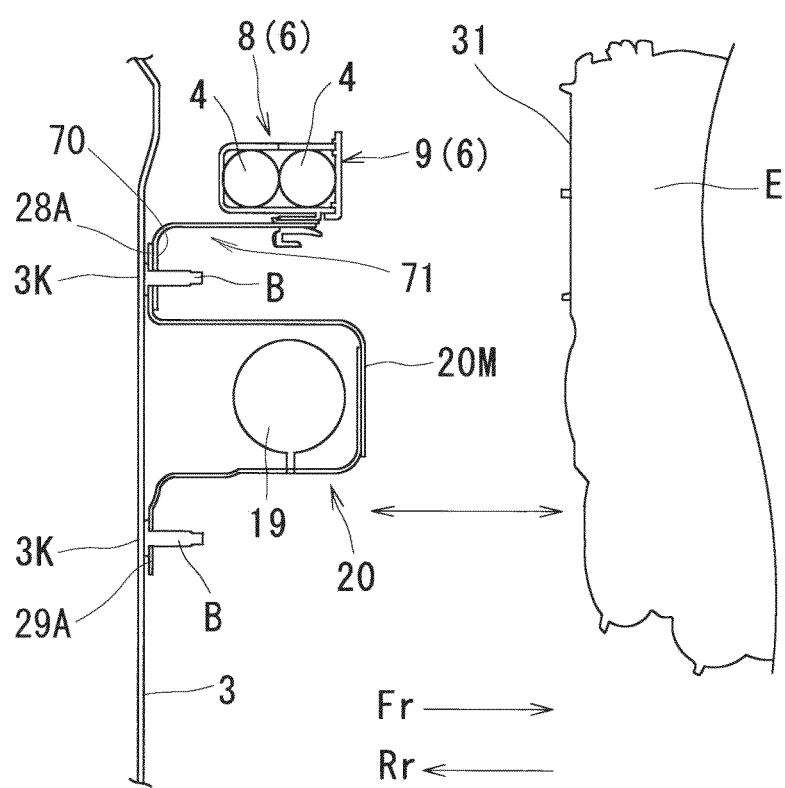
FIG. 6 is a view illustrating another embodiment.

Furthermore, as shown in FIG. 6, the wire harnesses 4 may not be fully covered by the water pump bracket 20, and a structure in which the wire harnesses 4 are arranged adjacent to (e.g., above) the water pump bracket 20 may be also employed.

In the embodiment, one piece 70 of a bracket 71 having an L shape in section that is located above the water pump bracket 20 and the attachment piece 28A of the water pump bracket 20 are fixed to the dash panel 3 by the stud bolts B, and the harness cover 6 is supported by the bracket 71 having an L shape in section. The surface 20M (the opposed surface) on the vehicle rear side Rr of the water pump bracket 20 is located closer to the engine E side than a surface on the vehicle rear side Rr of the harness cover 6. With the structure in the embodiment, the operability of an assembling operation of the harnesses 4 can be improved.

REFERENCE SIGNS LIST

3 Dash panel
3K Fixed portion
4 Cord-like element (wire harness)
19 Component (water pump)
20 Bracket (water pump bracket)
20M Opposed surface
28 Side wall of the bracket (upper-side side wall)
28A, 29A Fixing portion (attachment piece of the bracket)
E Engine
Rr Vehicle rear side

The invention claimed is:
1. A dash panel structure for an automobile, comprising:
a dash panel that separates an engine compartment and a vehicle cabin;
a cord-like element extending along the dash panel; and a component other than the cord-like element, the component fixed to the dash panel via a bracket, wherein the cord-like element is fixed to the bracket, and the cord-like element and the component are fixed to the dash panel via the bracket, wherein the bracket has an opposed surface located on an engine side with respect to a fixing portion of the dash panel, and the cord-like element is arranged on a vehicle rear side from the opposed surface, and wherein a fixed portion of the dash panel, to which the fixing portion is fixed, has a rigidity set to be lower than a rigidity of the bracket such that the fixed portion of the dash panel is deformed before the bracket when the opposed surface of the bracket is pressed toward the vehicle rear side by the engine.

2. The dash panel structure for an automobile according to claim 1, wherein the bracket includes a plurality of fixing portions as the fixing portion, the plurality of fixing portions are located apart from each other with the cord-like element and the component therebetween in an extension direction of the dash panel, and a plurality of fixed portions as the fixed portion are provided apart from each other corresponding to the plurality of fixing portions in the dash panel.

3. The dash panel structure for an automobile according to claim 1, wherein the bracket has two side walls that project toward the engine side from a dash panel side, and is formed in a hat shape in section in which distal ends of the two side walls are connected by the opposed surface, and the cord-like element is fixed to one of the two side walls.

4. The dash panel structure for an automobile according to claim 1, wherein the plurality of fixed portions and a surrounding portion of the dash panel are formed in a single plate-like shape.

5. The dash panel structure for an automobile according to claim 2, wherein the bracket has two side walls that project toward the engine side from a dash panel side, and is formed in a hat shape in section in which distal ends of the two side walls are connected by the opposed surface, and the cord-like element is fixed to one of the two side walls.

6. The dash panel structure for an automobile according to claim 2, wherein the plurality of fixed portions and a surrounding portion of the dash panel are formed in a single plate-like shape.

7. The dash panel structure for an automobile according to claim 3, wherein the plurality of fixed portions and a surrounding portion of the dash panel are formed in a single plate-like shape.

8. The dash panel structure for an automobile according to claim 5, wherein the plurality of fixed portions and a surrounding portion of the dash panel are formed in a single plate-like shape.

* * * * *